(12) United States Patent
Kim

(10) Patent No.: US 7,006,037 B2
(45) Date of Patent: Feb. 28, 2006

(54) METHOD FOR PROVIDING LOCATION INFORMATION IN MOBILE COMMUNICATION SYSTEM

(75) Inventor: Jin-Woong Kim, Ichon (KR)

(73) Assignee: Curitel Communications, Inc., (KR)

(*) Notice: Subject to any disclaimer, the term of this patent is extended or adjusted under 35 U.S.C. 154(b) by 0 days.

(21) Appl. No.: 10/750,000

(22) Filed: Dec. 30, 2003

(65) Prior Publication Data

US 2004/0233101 A1  Nov. 25, 2004

(30) Foreign Application Priority Data

May 23, 2003  (KR)  ............... 10-2003-0033022

(51) Int. Cl.
*G01S 5/14* (2006.01)
(52) U.S. Cl. ............ 342/357.09; 340/995.12; 340/995.15; 340/995.24; 340/995.28; 455/456.3
(58) Field of Classification Search ............... 342/357.09–357.1, 357.17; 340/995.12, 340/995.15, 995.16, 995.24, 995.28, 456.3; 701/208–212; 455/456.3
See application file for complete search history.

(56) References Cited

U.S. PATENT DOCUMENTS 5,745,867 A * 4/1998 Mills .............. 455/456.3
5,850,618 A * 12/1998 Suetsugu et al. .......... 701/212
6,233,518 B1 * 5/2001 Lee ..................... 340/995.13
6,430,498 B1 * 8/2002 Maruyama et al. .... 342/357.08
6,718,237 B1 * 4/2004 Murray et al. ............. 701/208
2003/0229441 A1 * 12/2003 Pechatnikov et al. ...... 701/210

FOREIGN PATENT DOCUMENTS

KR  1020030008982  1/2003

OTHER PUBLICATIONS

Origin. Academic Press Dictionary of Science and Technology (1992). Retrieved Nov. 29, 2004, from xreferplus. http://www.xreferplus.com/entry/3137406.*

* cited by examiner

*Primary Examiner*—Thomas H. Tarcza
*Assistant Examiner*—Fred H Mull
(74) *Attorney, Agent, or Firm*—Blakely Sokoloff Taylor & Zafman

(57) ABSTRACT

Provided is a method for providing location information in a mobile communication system. The method includes the steps of: a) receiving coordinates of current location of a GPS terminal and a request for location information which includes coordinates of geographical features adjacent to the GPS terminal from the GPS terminal; b) generating location information having coordinates of the geographical features adjacent to the GPS terminal; and c) transmitting the location information to the GPS terminal.

15 Claims, 3 Drawing Sheets

METHOD FOR PROVIDING LOCATION INFORMATION IN MOBILE COMMUNICATION SYSTEM

FIELD OF THE INVENTION

The present invention relates to a method for providing location information in a Global Positioning System (GPS) server or a GPS terminal; and, more particularly, to a method for providing location information in a GPS server or a GPS terminal that provides road information, building information and geographical information within a predetermined area in the form of coordinates and messages gradationally based on the latitudinal and longitudinal coordinates of a GPS terminal.

DESCRIPTION OF RELATED ART

In the present invention, a wireless communication terminal means a terminal that can be carried with an individual and communicated wirelessly with another terminal, for example, a mobile communication terminal, a Personal Communication Service (PCS) phone, a smart phone, a next-generation International Mobile Telecommunication-2000 (IMT-2000) terminal, and wireless local area network (LAN) terminal.

Global Positioning System (GPS) is a system for detecting a current location by receiving a radio wave transmitted from a satellite.

Generally, a wireless communication terminal with a GPS satellite signal receiver, which will be, hereinafter, referred to as a GPS terminal, receives information on its current location from a GPS satellite, and transmits the location information to a GPS server of a wireless communication service provider.

Then, the GPS server detects the location of the GPS terminal and transmits an image file that matches the current location of the GPS terminal on a map to the GPS terminal. The GPS terminal receives the image file and outputs it on a display unit.

The conventional method, which is described above, transmits the location information of the GPS terminal to the GPS terminal in the form of an image file. Therefore, it takes quite long time for the GPS terminal to receive the image file, and system resources are used wastefully to process the image file.

In short, in the conventional method, neighboring area of the current location is made into a plurality of image files upon the request of the GPS terminal. The image files of the neighboring area are transmitted to the GPS terminal successively. Even when a user of the GPS terminal walks slowly, high-volume image files for broad area are received continuously, which wastes system resources. If the GPS terminal is in a vehicle moving at a high speed, it takes very long time to process the high-volume image files that are received successively and thus the image files are displayed long after the vehicle has already passed out of the location.

Since the amount of data transmission is enormous, the conventional method causes excessive communication cost as well as wasteful use of communication network resources, which obstacles prevalent use of the location information providing service.

SUMMARY OF THE INVENTION

It is, therefore, an object of the present invention to provide method for providing location information in a GPS server or a Global Positioning System (GPS) terminal in the form of coordinates and messages. The location information providing method provides road information, building information and geographical information within a predetermined area in the form of coordinates and messages gradationally based on the latitudinal and longitudinal coordinates of a GPS terminal.

In accordance with an embodiment of the present invention, there is provided method for providing location information in a Global Positioning System (GPS) server, including the steps of: a) receiving coordinates of current location of a GPS terminal and a request for location information which includes coordinates of geographical features adjacent to the GPS terminal from the GPS terminal; b) generating location information having coordinates of the geographical features adjacent to the GPS terminal; and c) transmitting the location information to the GPS terminal.

In accordance with another embodiment of the present invention, there is provided a method for providing location information in a Global Positioning System (GPS) server, including the steps of: a) receiving coordinates of current location of a GPS terminal from the GPS terminal; b) generating basic location information which includes coordinates of main geographical features adjacent to a GPS terminal in response to a request for basic location information from the GPS terminal; c) transmitting the basic location information to the GPS terminal; d) generating additional location information which includes coordinates of detailed geographical features adjacent to the GPS terminal in response to a request for additional location information from the GPS terminal; and e) transmitting the additional location information to the GPS terminal.

In accordance with further another embodiment of the present invention, there is provided a method for providing location information in a Global Positioning System (GPS) terminal, including the steps of: a) requesting location information which includes coordinates of geographical features adjacent to the GPS terminal by transmitting coordinates of current location to a GPS server; b) receiving location information having coordinates of the geographical features adjacent to the GPS terminal; and c) generating graphical location information based on the location information.

In accordance with further another embodiment of the present invention, there is provided a method for providing location information in a Global Positioning System (GPS) terminal, including the steps of: a) requesting basic location information which includes coordinates of main geographical features adjacent to the GPS terminal and transmitting coordinates of current location to a GPS server; b) receiving the basic location information having main geographical features adjacent to the GPS terminal from the GPS server; c) outputting graphical basic location information on a display unit; d) requesting additional location information which includes coordinates of detailed geographical features adjacent to the GPS terminal; e) receiving the additional location information from the GPS server; and f) outputting graphical additional location information to the display unit.

In accordance with further another embodiment of the present invention, there is provided a mobile communication system for providing location information, including: a GPS server for receiving the coordinates of current location of a GPS mobile terminal, generating location information which includes coordinates of geographical features adjacent to the GPS terminal through retrieval of map data base, and transmitting the location information to the GPS terminal; and at least one GPS terminal for transmitting coordinates of its current location, requesting the location information to the GPS server, receiving the location information from the GPS server, generating graphical location information based on the location information, and displaying the graphical location information.

In accordance with further another embodiment of the present invention, there is provided a GPS server for providing location information, including: a receiver for receiving a location information request message and coordinates of the current location of a GPS terminal from a GPS terminal; a map database for storing map information; a transmitter for transmitting coordinates of geographical features adjacent to the GPS terminal; and a processor for retrieving the map database based on the coordinates of the current location of the GPS terminal.

In accordance with still further another embodiment of the present invention, there is provided a GPS terminal for providing location information, including: a GPS receiver for receiving a GPS signal from GPS satellites; a GPS processor for calculating coordinates of the current location of the GPS terminal using the GPS signal; a transmitter for transmitting a location information request message and coordinates of the current location of the GPS terminal; a receiver for receiving coordinates of geographical features adjacent to the GPS terminal from the GPS server; and a location information processor for generating graphical location information based on the coordinates of geographical features and displaying the graphical location information.

BRIEF DESCRIPTION OF THE DRAWING(S)

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
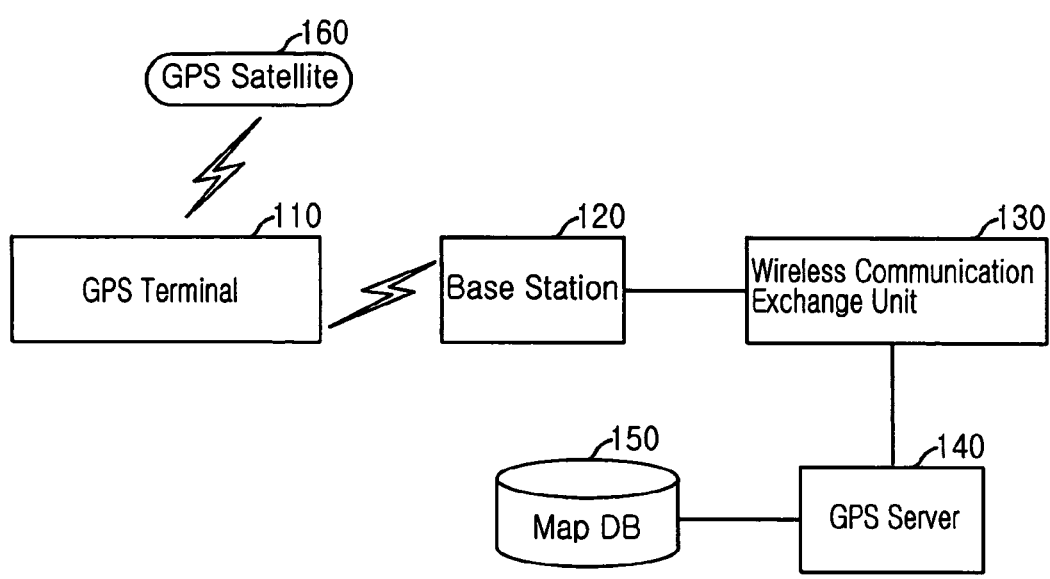
FIG. 1 is a block diagram illustrating a communication network including a Global Positioning System (GPS) server and a GPS terminal in accordance with an embodiment of the present invention.

FIG. 1 is a block diagram illustrating a communication network including a Global Positioning System (GPS) server and a GPS terminal in accordance with an embodiment of the present invention. The communication network includes a GPS terminal 110, a base station 120, a wireless communication exchange unit 130, a GPS server 140, a map database (DB) 150, and GPS satellite 160. Meanwhile, the GPS server 140 and the map DB 150 can be connected with the base station 120.

The GPS terminal 110 calculates its latitudinal and longitudinal location information using GPS signal from the GPS satellite 160 and transmits the location information to the GPS server 140 through the base station 120 and the wireless communication exchange unit 130.

The GPS server 140 processes the latitudinal and longitudinal location information transmitted from the GPS terminal 110 by using map data of the map DB 150. For example, the GPS server 140 finds the current location of the GPS terminal 110 and road, building and geographical information within the neighboring area of a predetermined range. The GPS server 140 sets up the current location of the GPS terminal 110 to be the origin (0,0), and determines the coordinates of roads and buildings in the neighboring area. Then, the GPS server 140 transmits the coordinates to the GPS terminal 110 carried on a message signal.

The GPS terminal 110 processes the coordinates using a graphic processor (not shown) in such a method as connecting the coordinates with a line and displays the result on a display unit.

Figure 2:
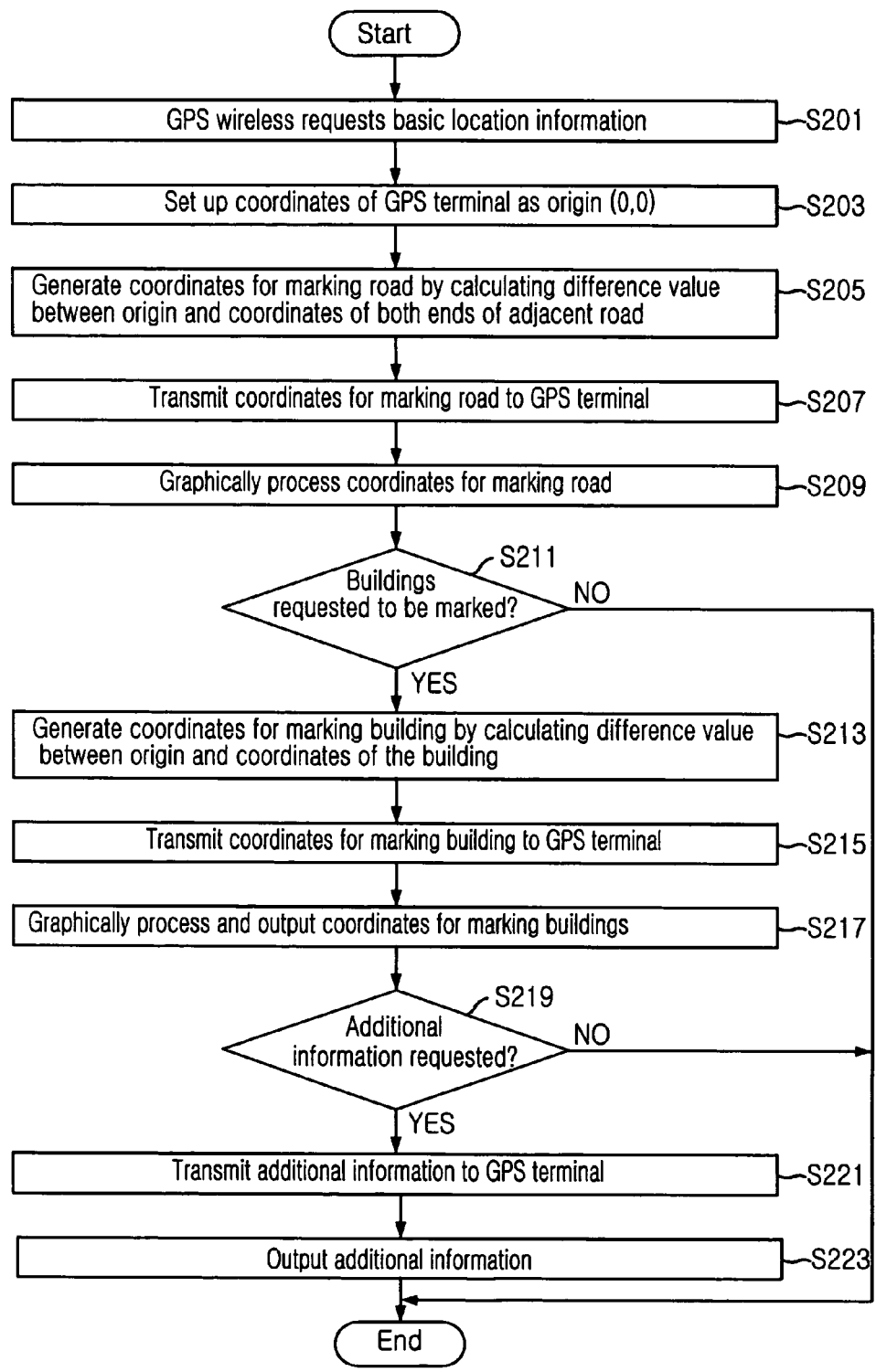
FIG. 2 is a flowchart describing a method for providing location information in a GPS server or GPS terminal in accordance with an embodiment of the present invention.

FIG. 2 is a flowchart describing a method for providing location information in the GPS server or the GPS terminal in accordance with an embodiment of the present invention. The GPS terminal 110 requests the GPS server 140 to send road, building and geographical information on the roads, buildings and geographical features neighboring the current location gradationally.

Then, the GPS server 140 processes the location information requested by the GPS terminal 110. The GPS terminal 110 transmits the request for location information and the GPS server 140 transmits response to the request for the location information in the form of message signals.

Referring to FIG. 2, the method for providing location information in the GPS server or the GPS terminal is described in detail. First, at step S201, the GPS terminal 110 requests the GPS server 140 to send basic location information. For example, the GPS terminal 110 transmits the current latitudinal and longitudinal coordinates to the GPS server 140 through a wireless communication exchange unit 130.

At step S203, the GPS server 140 sets up the current latitudinal and longitudinal coordinates of the GPS terminal 110 as an origin (0,0). Subsequently, at step S205, the GPS server 140 generates coordinates for marking a road by calculating difference values between the origin and the coordinates of both ends of the road neighboring the current location of the GPS terminal 110 based on a map DB 150.

At step S207, the GPS server 140 transmits the coordinates for marking the road to the GPS terminal 110. At step S209, the GPS terminal 110 receives the coordinates for marking the road, graphically processes the coordinates for marking the road, and outputs them on the display unit.

For example, the coordinates of both ends of the road are processed graphically in a method of connecting the received coordinates in a line, and the result is outputted on the display unit.

Meanwhile, at step S211, the GPS terminal 110 requests the GPS server 140 to mark the buildings around the road. At step S213, the GPS server 140 generates coordinates for a building by calculating difference values between the origin and the coordinates of the building adjacent to the roads based on the map DB 150.

At step S215, the GPS server 140 transmits the coordinates for marking the building to the GPS terminal 110. Then, at step S217, the GPS terminal 110 receives the coordinates for marking the building, processes them graphically, and outputs the result on the display unit.

For example, the received coordinates are processed graphically using the graphic processor built in the GPS terminal 110 in such a method as connecting the coordinates of the angular points of each building in a line, and the result is outputted on the display unit.

Meanwhile, at step S219, the GPS terminal 110 requests additional information such as a name of the detailed road or the building, distance between geographical features, and the address of the current location. Then, the GPS server 140 abstracts the corresponding additional information out of the map DB 150 and transmits it to the GPS terminal 110. At step S223, the GPS terminal 110, receives the additional information and outputs it on the display unit.

At the step S211, the GPS terminal 110 requests to mark buildings, name of a road or a building, distance and address of the current location, optionally. The above geographical information and building information will be referred to as additional location information, herein.

That is, the GPS terminal 110 receives the basic location information such as road information, and requests the GPS server 140 to show the additional location information gradationally by selecting additional location information which is desired to be marked among the information on buildings around a road and the geographical information in the current location of the GPS terminal.

Also, the GPS terminal 110 divides the buildings into government and public offices, residential buildings, medical facilities/lodging accommodations, educational facilities, commercial offices/stores, and warehouses/factories, and requests the GPS server 140 to mark the buildings. Then, the GPS server 140 transmits the coordinates for marking the buildings to the GPS terminal 110.

In another embodiment of the present invention, the GPS terminal 110 transmits the coordinates of its current location to the GPS server 140 and, at the same time, selects options for map. In other words, when the GPS terminal 110 first requests the GPS server to send the basic location information, it transmits its current latitude and longitude, and selects additional location information, such as name of a road or a building, and distance and address of current location.

Then, the GPS server 140 generates coordinates for marking the roads and the buildings neighboring the current location of the GPS terminal 110 and additional information corresponding thereto, and transmits the coordinates and the additional information to the GPS terminal 110. Since another embodiment of the present invention can be executed by those skilled in the art from the detailed description of the embodiment, further description on it will be omitted.

Figure 3:
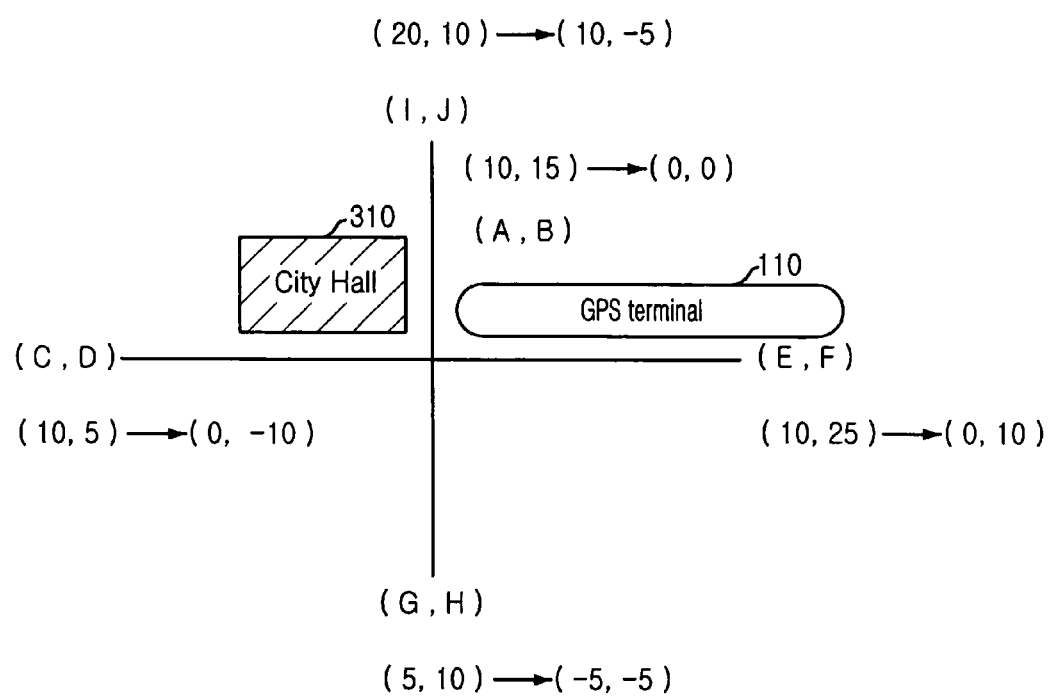
FIG. 3 is a diagram illustrating how coordinates of an adjacent road and buildings are established in a GPS terminal in accordance with an embodiment of the present invention.

FIG. 3 is a diagram illustrating how coordinates of an adjacent road and buildings are established in the GPS terminal in accordance with an embodiment of the present invention.

The latitude and the longitude of the GPS terminal 110 provided by the GPS satellite 160 is (10,15). Let's just say that the latitudes and the longitudes of the four spots of an road adjacent to the current location of the GPS terminal 110, which are (C, D), (E, F), (G, H) and (I, J), are (10, 5), (10, 25), (5, 10) and (20, 10).

Here, the current location (10, 15) of the GPS terminal 110 is set to be the origin (0, 0), and the difference values between the origin (0, 0) and the coordinates of the four spots of the road are calculated to generate coordinates for making the road. The coordinates for marking the four spots of the road, i.e., (C, D), (E, F), (G, H) and (I, J), are (0, −10), (0, 10), (−5, −5) and (10, −5), respectively.

Similarly, the difference values between the origin and the four angular points of a city hall building 310 are calculated to thereby generate coordinates for marking the city hall building 310.

The method of the present invention can reduce the amount of data transmission and time and cost which, otherwise, must be consumed for processing the reduced data amount by providing location information such as roads, buildings and geographical information neighboring the current location of the GPS terminal 110 in the form of messages. It also reduces wasteful use of system resources.

Since the method of the present invention processes location information only desired to be marked by a user gradationally, it can reduce time, cost, and excessive use of system resources taken for processing the location information.

Differently from conventional time-based charging system, in accordance with the present invention, the method of the users can use the GPS service at an inexpensive cost as low as for short message service by charging the users based on the number of accesses.

While the present invention has been described with respect to certain preferred embodiments, it will be apparent to those skilled in the art that various changes and modifications may be made without departing from the scope of the invention as defined in the following claims.

What is claimed is:

1. A method for providing location information in a Global Positioning System (GPS) server, comprising the steps of:
   a) receiving coordinates of current location of a mobile communication terminal having a GPS receiver and a request for location information, where the location information includes coordinates of geographical features adjacent to the mobile communication terminal from the mobile communication terminal;
   b) setting up the received coordinates of current location of the mobile communication terminal as an origin;
   c) generating location information having coordinates of the geographical features adjacent to the mobile communication terminal by calculating difference values between the origin and the coordinates of geographical features; and
   d) transmitting the location information and map information to the mobile communication terminal, wherein the map information transmitted to the mobile communication terminal is gradationally changed in response to a user's request.

2. The method as recited in claim 1, wherein the geographical features include roads and buildings.

3. A method for providing location information in a Global Positioning System (GPS) server, comprising the steps of:
   a) receiving coordinates of current location of a mobile communication terminal having a GPS receiver from the mobile communication terminal;
   b) setting up the received coordinates of current location of the mobile communication terminal as an origin;
   c) generating basic location information, where the basic location information includes coordinates of main geographical features adjacent to a mobile communication terminal in response to a request for basic location information from the mobile communication terminal by calculating difference values between the origin and the coordinates of geographical features;
   d) transmitting the basic location information to the mobile communication terminal;

e) generating additional location information, where the additional location information includes coordinates of detailed geographical features adjacent to the mobile communication terminal in response to a request for additional location information from the mobile communication terminal by calculating difference values between the origin and the coordinates of detailed geographical features; and f) transmitting the additional location information and map information to the mobile communication terminal, wherein the map information transmitted to the mobile communication terminal is gradationally changed in response to a user's request.

4. The method as recited in claim 3, wherein the main geographical features include location of main buildings, figure of main buildings, location of main roads and figure of main roads.

5. The method as recited in claim 3, wherein the detailed geographical features include location of buildings, figure of buildings, location of roads and figure of roads.

6. A method for providing location information in a Global Positioning System (GPS) terminal, comprising the steps of:

a) requesting location information, where the location information includes coordinates of geographical features adjacent to a mobile communication terminal having a GPS receiver by transmitting coordinates of current location to a GPS server;

b) receiving difference values between the coordinates of current location of the mobile communication terminal and the coordinates of the geographical features adjacent to the mobile communication terminal as the location information; and c) generating graphical location information based on the location information and map information, wherein the map information transmitted to the mobile communication terminal is gradationally changed in response to a user's request.

7. A method for providing location information in a Global Positioning System (GPS) terminal, comprising the steps of:

a) requesting basic location information, where the basic location information includes coordinates of main geographical features adjacent to a mobile communication terminal having a GPS receiver and transmitting coordinates of current location to a GPS server;

b) receiving difference values between the coordinates of current location of the GPS terminal and the coordinates of main geographical features adjacent to the mobile communication terminal as the basic location information from the GPS server;

c) outputting graphical basic location information on a display unit;

d) requesting additional location information, where the additional location information includes coordinates of detailed geographical features adjacent to the mobile communication terminal;

e) receiving map information, difference values between the coordinates of current location of the mobile communication terminal and the coordinates of detailed geographical features adjacent to the mobile communication terminal as the additional location information from the GPS server, wherein the map information transmitted to the mobile communication terminal is gradationally changed in response to a user's request; and f) outputting the additional location information to the display unit.

8. The method as recited in claim 7, wherein the main geographical features include location of main roads, figure of main roads, location of main buildings and figure of main buildings.

9. The method as recited in claim 7, wherein the detailed geographical feature include location of roads, figure of road, location of buildings and figure of buildings.

10. A mobile communication system for providing location information, comprising:

a GPS server for receiving the coordinates of current location of a mobile terminal having a GPS receiver, generating location information, where the location information includes coordinates of geographical features adjacent to the mobile terminal through retrieval of map data base by setting up the received coordinates of current location of the mobile terminal as an origin and calculating difference values between the origin and the coordinates of geographical features, and transmitting the location information and map information to the mobile terminal, wherein the map information transmitted to the mobile terminal is gradationally changed in response to a user's request; and at least one mobile terminal for transmitting coordinates of its current location, requesting the location information from the GPS server, receiving difference values between the coordinates of current location of the mobile terminal and the coordinates of geographical features adjacent to the mobile terminal as the location information from the GPS server, generating graphical location information based on the location information, and displaying the graphical location information.

11. The mobile communication system recited in claim 10, wherein the geographical features include roads and buildings.

12. A GPS server for providing location information, comprising:

a receiver for receiving a location information request message and coordinates of a current location of a mobile terminal having a GPS receiver from a mobile terminal;

a map database for storing map information;

a transmitter for transmitting map information and location information of geographical features adjacent to the mobile terminal, wherein the map information transmitted to the mobile terminal is gradationally changed in response to a user's request; and a processor for setting up the received coordinates of current location of the mobile terminal as an origin, generating the location information by calculating difference values between the origin and the coordinates of geographical features stored in the map database.

13. The GPS terminal recited claim 12, wherein the geographical features include roads and buildings.

14. A GPS terminal for providing location information, comprising:

a GPS server for receiving a GPS signal from GPS satellites;

a GPS processor for calculating coordinates of the current location of a mobile terminal using the GPS signal;

a transmitter for transmitting a location information request message, map information and coordinates of the current location of the mobile terminal, wherein the map information transmitted to the mobile terminal is gradationally changed in response to a user's request;

a receiver for receiving the map information, difference values between the coordinates of current location of the mobile terminal and the coordinates of the geographical features adjacent to the mobile terminal as location information; and a location information processor for generating graphical location information based on the received difference values and displaying the graphical location information.

15. The GPS terminal recited in claim 14, wherein the geographical features include roads and buildings.

* * * * *